(12) United States Patent
Noh et al.

(10) Patent No.: US 10,658,740 B2
(45) Date of Patent: May 19, 2020

(54) ANTENNA UNIT AND WIRELESS POWER TRANSMISSION MODULE INCLUDING SAME

(71) Applicant: Amotech Co., Ltd., Incheon (KR)

(72) Inventors: Jin Won Noh, Gwangju (KR); Hyung-Il Baek, Yongin-si (KR); Jae-Il Park, Yeoju-si (KR)

(73) Assignee: Amotech Co., Ltd., Incheon (KR)

( * ) Notice: Subject to any disclaimer, the term of this patent is extended or adjusted under 35 U.S.C. 154(b) by 156 days.

(21) Appl. No.: 15/753,037

(22) PCT Filed: Jul. 11, 2016

(86) PCT No.: PCT/KR2016/007485
§ 371 (c)(1),
(2) Date: Feb. 15, 2018

(87) PCT Pub. No.: WO2017/030289
PCT Pub. Date: Feb. 23, 2017

(65) Prior Publication Data
US 2018/0248255 A1 Aug. 30, 2018

(30) Foreign Application Priority Data
Aug. 20, 2015 (KR) .................. 10-2015-0117359

(51) Int. Cl.
*H01Q 1/38* (2006.01)
*H01Q 1/52* (2006.01)
(Continued)

(52) U.S. Cl.
CPC ........... *H01Q 1/38* (2013.01); *H01F 27/2871* (2013.01); *H01F 27/365* (2013.01); *H01F 38/14* (2013.01);
(Continued)

(58) Field of Classification Search
USPC ........................................................ 307/104
See application file for complete search history.

(56) References Cited

U.S. PATENT DOCUMENTS

| 7,183,987 B2 | 2/2007 | Akiho et al. |
| 2015/0171519 A1 | 6/2015 | Han et al. |
| 2016/0064814 A1 | 3/2016 | Jang et al. |

FOREIGN PATENT DOCUMENTS

| CN | 1596415 A | 3/2005 |
| CN | 102013557 | * 4/2011 |

(Continued)

OTHER PUBLICATIONS

International Search Report dated Nov. 10, 2016 corresponding to International Application No. PCT/KR2016/007485; 4 Pages.

*Primary Examiner* — Rexford N Barnie
*Assistant Examiner* — Xuan Ly
(74) *Attorney, Agent, or Firm* — Daly Crowley Mofford & Durkee, LLP

(57) ABSTRACT

Provided are an antenna unit and a wireless power transmission module. There is provided an antenna unit that includes a circuit board, and a first antenna pattern formed on a surface of the circuit board for wireless power transmission and formed of a single conductor including a plurality of windings. The single conductor has a different line width depending on position. There is provided a wireless power transmission module that includes any one of the antenna units, and a shielding unit disposed on one surface of the antenna unit and configured to shield a magnetic field.

17 Claims, 10 Drawing Sheets

(51) Int. Cl.
*H01Q 7/00* (2006.01)
*H02J 50/10* (2016.01)
*H02J 50/70* (2016.01)
*H02J 7/02* (2016.01)
*H04B 5/00* (2006.01)
*H01Q 1/02* (2006.01)
*H01F 27/36* (2006.01)
*H01F 38/14* (2006.01)
*H01F 27/28* (2006.01)

(52) U.S. Cl.
CPC ............... *H01Q 1/02* (2013.01); *H01Q 1/526* (2013.01); *H01Q 7/00* (2013.01); *H02J 7/025* (2013.01); *H02J 50/10* (2016.02); *H02J 50/70* (2016.02); *H04B 5/0037* (2013.01); *H04B 5/0081* (2013.01)

(56) References Cited

FOREIGN PATENT DOCUMENTS

| | | | |
|---|---|---|---|
| CN | 102013557 A | | 4/2011 |
| JP | 2004-166176 A | | 6/2004 |
| JP | 2004166176 | * | 6/2004 |
| KR | 10-2009-0086863 A | | 8/2009 |
| KR | 20090086863 | * | 8/2009 |
| KR | 10-2013-0134759 A | | 12/2013 |
| KR | 2014-0034010 A | | 3/2014 |
| KR | 20140034010 | * | 3/2014 |
| KR | 10-2014-0057973 A | | 5/2014 |
| KR | 20150050541 | * | 5/2015 |
| KR | 10-2015-0050541 A | | 6/2015 |

* cited by examiner

ANTENNA UNIT AND WIRELESS POWER TRANSMISSION MODULE INCLUDING SAME

CROSS-REFERENCE TO RELATED APPLICATION

This application is a U.S. National Stage of PCT/KR2016/007485 filed in the Korean language on Jul. 11, 2016, entitled: "Antenna Unit And Wireless Power Transmission Module Including Same" which application claims priority to Korean Application No. 10-2015-0117359 filed on Aug. 20, 2015, which applications are each hereby incorporated herein by reference in their entireties.

BACKGROUND

1. Technical Field

The present disclosure relates to an antenna unit, and more particularly, to the antenna unit and a wireless power transmission module including the same, capable of minimizing a heat generation amount during wireless power transmission.

2. Discussion of the Related Art

Recently, portable electronic devices such as a mobile phone, a tablet PC, and the like are equipped with a wireless communication module for wireless communication and a wireless power transmission module for wireless charging of a built-in battery. In the early days, methods for improving a charging efficiency were mainly studied. Recently, however, as a problem of a heat generation during wireless charging has increased, a design of antenna pattern to minimize the heat generation is required.

Generally, the heat generated during the wireless power transmission is proportional to a resistance value of a conductor such as a coil or the like constituting an antenna pattern. Here, the resistance value of the conductor is inversely proportional to a cross-sectional area of the conductor, that is, a line width or a thickness, while proportional to the number of winding turns.

A reception antenna (or Rx coil) for wireless power transmission is required to have an appropriate level of inductance, an outer diameter, and an inner diameter depending on a transmission antenna (or Tx coil) of the other side, a charging method and an efficiency. Therefore, it is most common to increase the thickness of the antenna pattern in order to reduce the heat generation amount by minimizing the resistance value.

The increase of the cross-sectional area of the antenna pattern (that is, the increase of the line width and the thickness of the copper foil) may lead to an increase of the overall the antenna size and thickness. Therefore, by reducing the number of winding turns of the antenna pattern while keeping the cross-sectional area of the antenna pattern constant, the entire resistance value of the antenna may be reduced. However, since the number of winding turns of the antenna pattern is proportional to the inductance, there is a limit to reduce the number of winding turns of the antenna pattern to obtain the proper inductance.

Particularly, in a combo antenna structure in which two or more antennas such as a near field communication (NFC) antenna, a magnetic secure transmission (MST) antenna, and a wireless power transmission (a magnetic induction, or a magnetic resonance) antenna are combined, an increase in the size of the wireless power transmission antenna pattern may result in performance degradation of the antennas other than the wireless power transmission antenna.

In addition, when a wireless power transmission antenna is implemented with a flexible printed circuit board (FPCB), a structure in which the same wire pattern is formed on its both sides and the both wire patterns are connected with each other through a via-hole is used to reduce the resistance value of the antenna. However, for the structure, it is not so easy to implement the minimization of the resistance value of the antenna due to some restrictions on the overall thickness and size of the antenna.

Therefore, it is needed to develop a technique capable of reducing the resistance value of the antenna by additionally changing the antenna pattern while satisfying the specifications of the antenna such as the inner diameter and the outer diameter of the wireless power transmission antenna.

SUMMARY

It is an object of the present disclosure to provide an antenna unit capable of minimizing the heat generation amount by the resistance value of the antenna pattern while satisfying the specifications of the antenna.

It is another object of the present disclosure to provide a wireless power transmission module capable of improving the wireless power transmission efficiency and minimizing the heat generation amount.

To accomplish the above objects of the present disclosure, there is provided an antenna unit that includes a circuit board, and a first antenna pattern formed on a surface of the circuit board for wireless power transmission and formed of a single conductor including a plurality of windings, wherein the single conductor has a different line width depending on position.

In an embodiment of the present disclosure, the circuit board may be made from a flexible material.

In an embodiment of the present disclosure, a line width of an outermost winding of the first antenna pattern formed at an outermost portion of the circuit board may be larger than a line width of an innermost winding of the first antenna pattern formed at an innermost portion of the circuit board.

In an embodiment of the present disclosure, a line width of an intermediate winding of the first antenna pattern between the outermost winding and the innermost winding may be gradually decreased as going toward the innermost winding.

In an embodiment of the present disclosure, the first antenna pattern may include at least two windings having the same line width which are adjacent to each other.

In an embodiment of the present disclosure, remaining windings of the first antenna pattern except for the innermost winding are divided into a first half windings and a second half windings so that the first half windings have a same first line width and the second half windings have a same second line width.

In an embodiment of the present disclosure, at least one of the intermediate windings may have a larger line width than that of the outermost winding.

In an embodiment of the present disclosure, a line width of the first antenna pattern may be gradually increased as going from the outermost winding to the intermediate winding, and a line width of the first antenna pattern may be gradually decreased as going from the intermediate winding to the innermost winding.

In an embodiment of the present disclosure, the first antenna pattern may include at least two of the intermediate windings, which are adjacent to each other, having a larger line width than that of the outermost winding.

In an embodiment of the present disclosure, the first antenna pattern may be disposed in an area of which center is away from a center of the circuit board.

In an embodiment of the present disclosure, at least one of a left portion, a right portion, an upper portion, and a lower portion of the first antenna pattern may have a different line width from that of the other portions.

In an embodiment of the present disclosure, the antenna unit may further include at least one second antenna pattern formed outside the first antenna pattern on the circuit board for wireless communication.

To accomplish the above objects of the present disclosure, there is provided an antenna unit that includes a circuit board, a first antenna pattern, and a second antenna pattern. The first antenna pattern is formed on one surface of the circuit board for wireless charging, and formed of a single conductor including a plurality of windings. The second antenna pattern is formed on the other surface of the circuit board, including a plurality of conductors each of which is formed of a single winding, wherein both ends of each of the plurality of conductors are connected in parallel to each of plurality of windings of the first antenna pattern through via holes, and wherein the plurality of conductors have different line widths from each other.

In an embodiment of the present disclosure, the antenna unit may further include at least one third antenna pattern formed outside the first antenna pattern on the circuit board for wireless communication.

According to embodiments of the present disclosure, there is provided a wireless power transmission module that includes any one of the antenna units mentioned above, and a shielding unit disposed on one surface of the antenna unit and configured to shield a magnetic field (to shield a magnetic field and condense the magnetic field in a desired direction).

In an embodiment of the present disclosure, the shielding unit may include any one of a ribbon sheet made from an amorphous alloy or a nanocrystal alloy, a ferrite sheet, and a polymer sheet.

In an embodiment of the present disclosure, the shielding unit may be a form including a plurality of divided fine pieces.

In an embodiment of the present disclosure, the plurality of divided fine pieces may be totally or partially insulated from each other.

According to the present disclosure, since the line widths of the windings constituting the antenna pattern are different from each other and thus the resistance value of the antenna is reduced, it is possible to minimize the heat generation amount during the wireless power transmission while satisfying the specifications of the antenna.

In addition, by forming the pattern of the inner windings of the antenna to be thinner than the pattern of the outer windings of the antenna, a free space can be secured on the inner side of the antenna. Thus, the inductance, the outer and inner diameters, and the arrangement of the antenna can be easily adjusted, which can enhance a degree of freedom of antenna design.

DETAILED DESCRIPTION OF THE EMBODIMENTS

Figure 1:
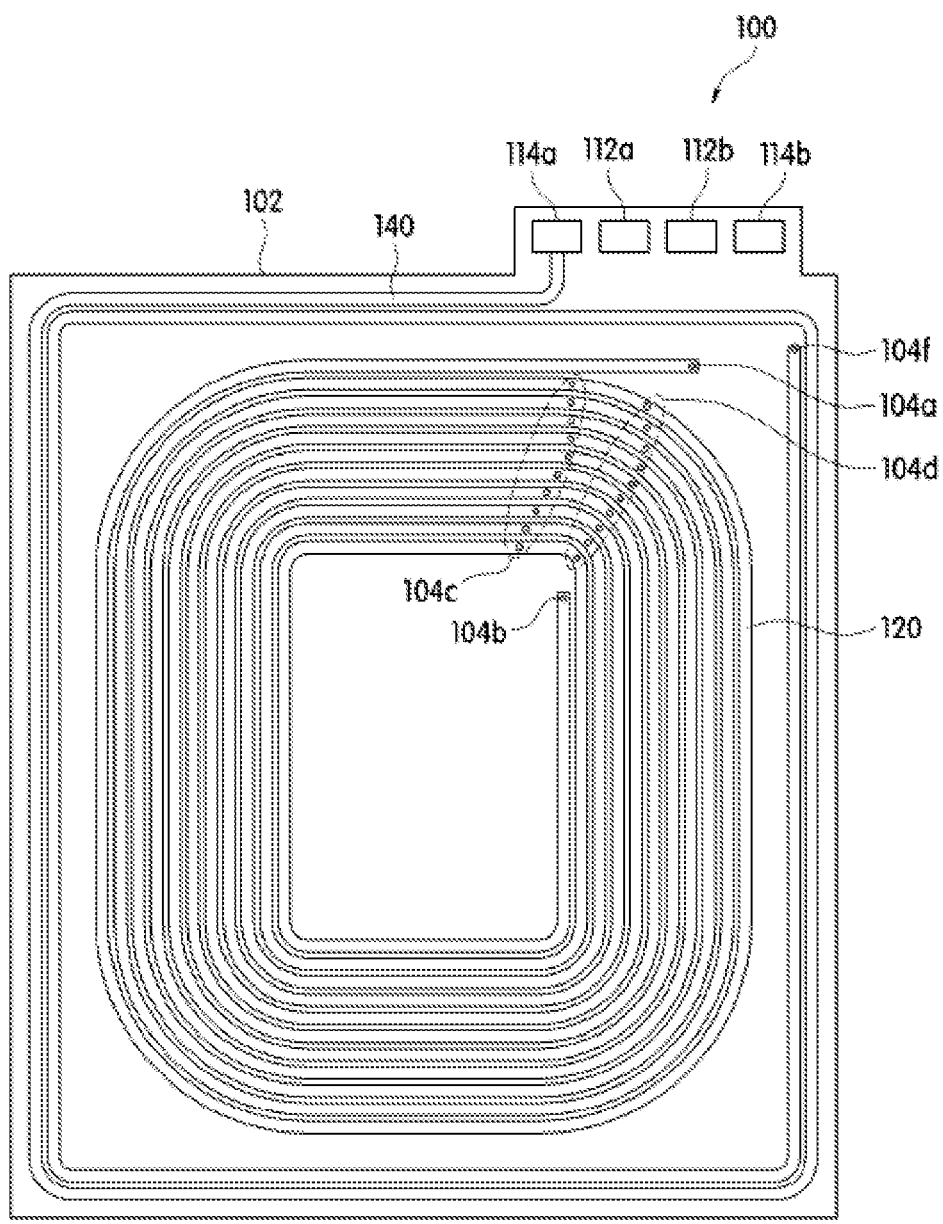
FIG. 1 is a plane view of an antenna unit according to an embodiment of the present disclosure.

Hereinafter, exemplary embodiments of the present disclosure will be described in detail with reference to the accompanying drawings, which will be readily apparent to those skilled in the art to which the present disclosure pertains. The present disclosure may be embodied in many different forms and is not limited to the embodiments described herein. In the drawings, parts not relating to the description are omitted for clarifying the present disclosure, and the same reference numerals are assigned to the same or similar components throughout the specification.

Figure 2:
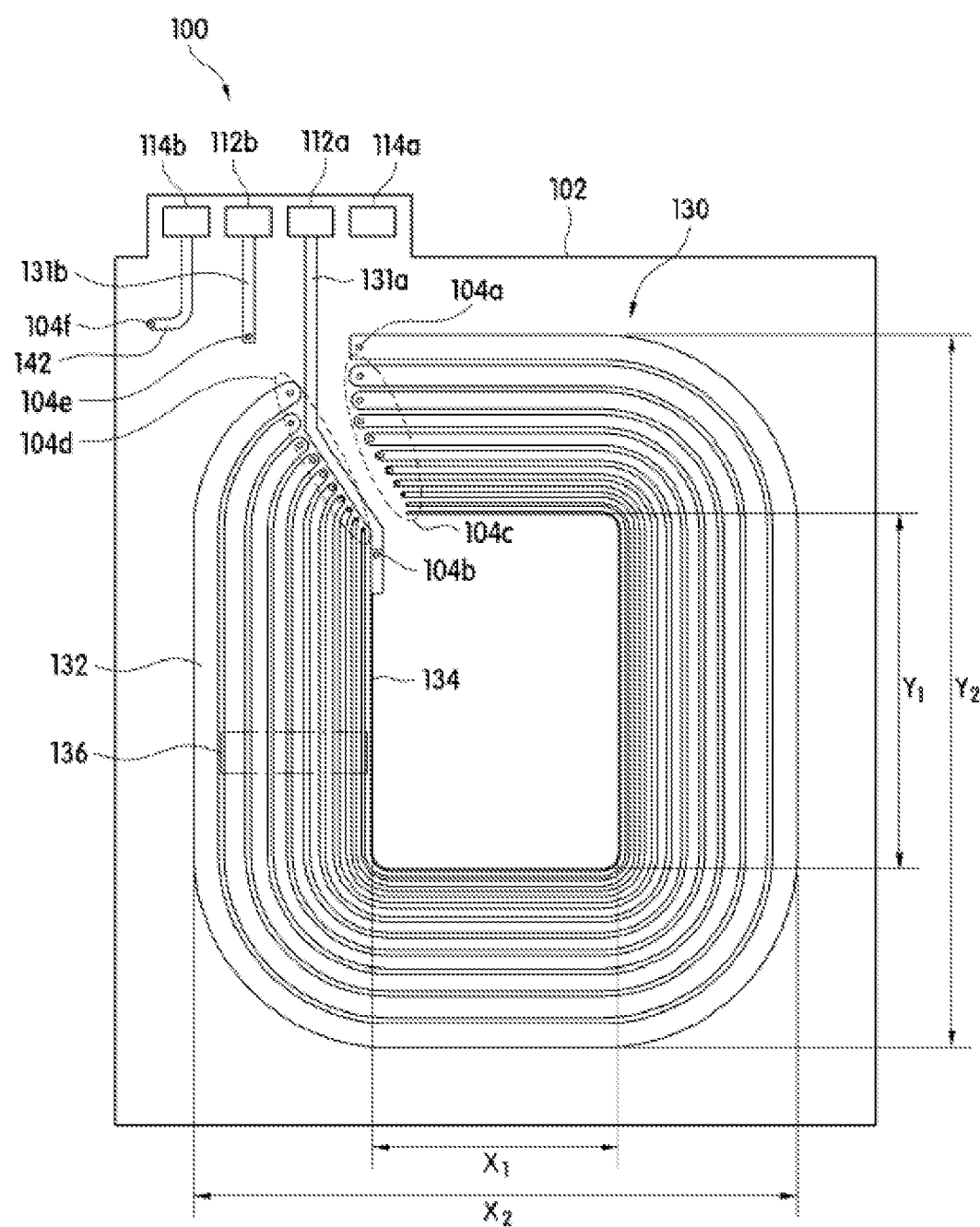
FIG. 2 is a rear view of the antenna unit shown in FIG. 1.

As shown in FIGS. 1 and 2, an antenna unit 100 according to an embodiment of the present disclosure may include a circuit board 102, a first antenna pattern 120, and a second antenna pattern 130.

The circuit board 102 may be a substrate having at least one antenna or a circuit unit formed optionally on an upper surface thereof. The circuit board 102 may be made from a material having a heat resistance, a pressure resistance and flexibility. Considering the physical properties of such a material, a thermosetting polymer film such as a film made from polyimide (PI), polyethylene terephthalate (PET), or the like may be used as the circuit board 102. In particular, the PI film can withstand a high temperature of 400° C. or higher and a low temperature of −269° C., this is, has super heat resistance and super cold resistance. In addition, the PI film is thin and flexible, and has a strong chemical resistance and an abrasion resistance. For these reasons, the PI film may be widely used to provide a stable performance in a severe environment.

In addition, the circuit unit (not shown) or a connection terminal unit 110 for electrical connection with an electronic device may be provided on a side of the circuit board 102 corresponding to the number of antennas. For example, as shown in FIGS. 1 and 2, the connection terminal unit 110 may include wireless power transmission antenna terminals 112a and 112b and wireless communication antenna terminals 114a and 114b.

Here, the wireless power transmission antenna terminals 112a and 112b may be connected to the first antenna pattern 120 and the second antenna pattern 130, and the wireless communication antenna terminals 114a and 114b may be connected to a third antenna pattern 140.

The first antenna pattern 120 and the second antenna pattern 130 may be the wireless power transmission antennas for charging the wireless power and function as a reception coil (Rx coil) or a transmission coil (Tx coil).

The first antenna pattern 120 and the second antenna pattern 130 may be the wireless power transmission antenna operable in a magnetic resonance method at a frequency of 6.78 MHz, or the wireless power transmission antenna operable in a magnetic induction method in a frequency band of 100 to 350 kHz.

As shown in FIG. 1, the first antenna pattern 120 may be formed on one surface of the circuit board 102, and formed of a single conductor which may include a plurality of windings. In an exemplary example, the first antenna pattern 120 may be formed of a flat coil wound in a clockwise direction or a counterclockwise direction. The wound flat coil may have a circular shape, an elliptical shape, a spiral shape, or a polygonal shape such as a quadrangular shape.

The second antenna pattern 130 may be formed on the other surface of the circuit board 102, that is, the opposite surface of the surface on which the first antenna pattern 120 is formed. The second antenna pattern 130 may be connected with the first antenna pattern 120 in parallel through via-holes 104a, 104b, 104c and 104d.

As shown in FIG. 2, the second antenna pattern 130 may include a plurality of conductors 132, 134, and 136, and each of the conductors 132, 134 and 136 may include a single winding. That is, since the connection pattern 131a for connecting the wireless power transmission antenna terminal 112a is to be drawn from inside to outside of the second antenna pattern 130, each of the conductors 132, 134 or 136 constituting the second antenna pattern 130 may be formed independently.

Both ends of each of the conductors 132, 134, or 136 may be connected in parallel to each of the plurality of windings of the first antenna pattern 120 through via-holes 104c and 104d. That is, as shown in FIGS. 1 and 2, the conductors 132, 134, and 136 may be connected in parallel through via-holes 104c and 104d at corresponding positions of the first antenna pattern 120.

Here, each of the conductors, that is, each of the windings 132, 134, and 136 may have a different line width from each other.

Particularly, in order to reduce the total resistance value of the wireless power transmission antenna including the first antenna pattern 120 and the second antenna pattern 130, the line width of the outermost winding 132 of the second antenna pattern 130 formed at the outermost portion of the circuit board 102 may be larger than the line width of the innermost winding 134 formed at the innermost portion of the circuit board 102.

Particularly, in order to reduce the total resistance value of the wireless power transmission antenna, the line width of the second antenna pattern 130 may be increased. In this case, since the length of the windings of the second antenna pattern 130 becomes larger as going from the inner portion to the outer portion of the circuit board 102, the influence on the total resistance value by adjusting the line width may appear larger in the outer portion of the second antenna pattern 130 than in the inner portion thereof. Therefore, it is preferable to make the line width of the windings larger as going from the innermost winding to the outermost winding.

Here, the line widths of the intermediate windings of the second antenna pattern 130 between the outermost winding and the innermost winding may be gradually decreased as going toward the innermost winding.

By differentiating from each other the line widths of windings 132, 134 or 136 of the second antenna pattern 130, the total resistance value of the second antenna pattern 130 may be reduced. Therefore, the heat generation amount by the wireless power transmission antenna may be also reduced.

Furthermore, since the line width of the inner winding is thinner than the outer winding of the second antenna pattern, a free space may be secured inside the antenna under a predetermined antenna specification. Therefore, a freedom may be enlarged in designing the antenna with respect to, for example, arrangement, and dimension of the inner diameters X1 and Y1 and the outer diameters X2 and Y2 of the second antenna pattern 130.

The second antenna pattern 130 may further include connection patterns 131a and 131b for connecting the windings to the wireless power transmission antenna terminals 112a and 112b. The connection patterns 131a and 131b may be connected to the innermost winding 134 or the outermost winding 132 through the via-holes 104d and 104e, respectively. At this time, the connection patterns 131a and 131b may be omitted or changed in their positions depending on the design of the second antenna pattern 130 and the terminal unit 110.

When the second antenna pattern 130 is formed of a plurality of conductors 132, 134, and 136 of which line widths are different from each other, the intervals between the windings of the third antenna patterns 140 and 142 may be adjusted depending on the positions of the via-holes 104a, 104b, 104c and 104d which are provided for the connection in parallel with each of the conductors 132, 134 and 136. That is, since the third antenna patterns 140 and 142 are formed of a single conductor having the same line width, the interval between the windings of the third antenna patterns 140 and 142 may be adjusted so as to be disposed at the same or similar positions as the windings of the second antenna pattern 130 based on the via-holes 104a, 104b, 104c, and 104d.

Alternatively, similar to the second antenna pattern 130, the first antenna pattern 120 may be formed of a single conductor of which line width is varied depending on the position of the winding.

Like this, the line widths of the windings 132, 134, and 136 of the second antenna pattern 130 may be determined to have a variety of values in order to reduce the overall resistance value of the second antenna pattern 130.

Figure 3:
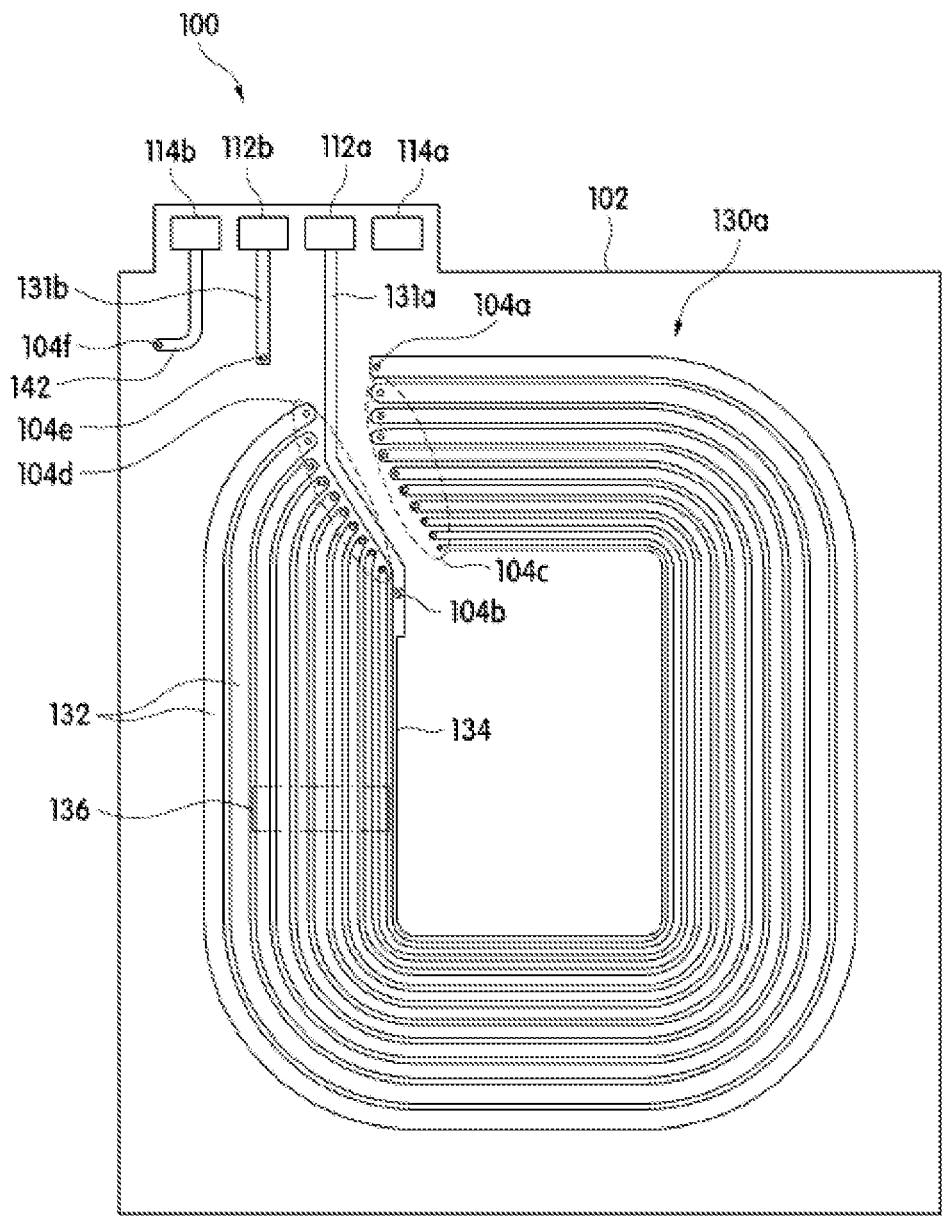
FIGS. 3 to 7 are rear views of antenna patterns having various line widths in an antenna unit according to an embodiment of the present disclosure.

For example, as shown in FIG. 3, the line width of the second antenna pattern 130a may be decreased as going from the outermost winding 132 to the innermost winding 134, and at least two windings having the same line width may be disposed adjacent to each other.

In the second antenna pattern 130a, as the windings 132, 134, and 136 are disposed adjacent to each other, a free space may be secured inside the second antenna pattern 130a. Thus, it may be easy to meet the antenna specification and the freedom of the antenna design can be enhanced.

Figure 4:
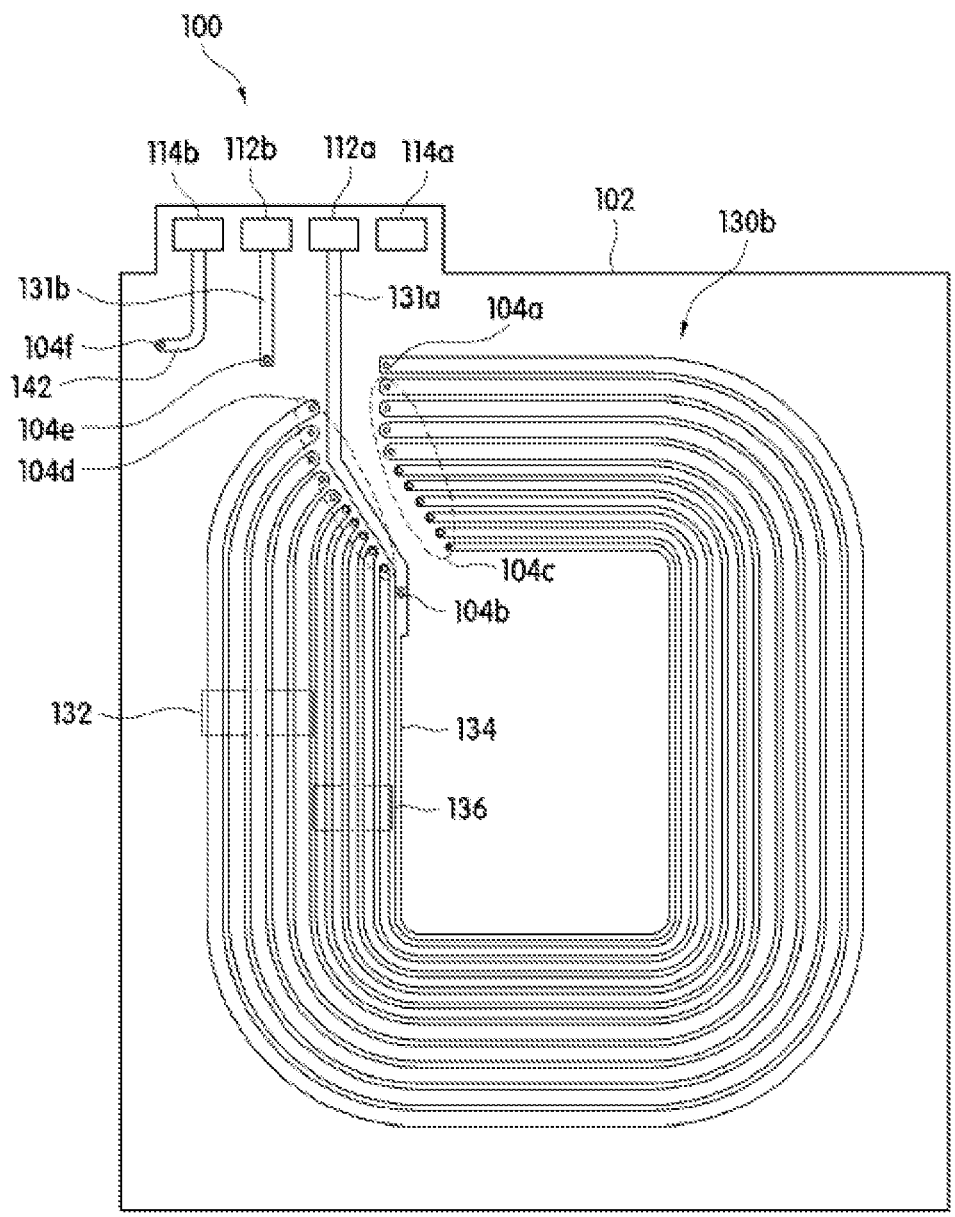

As shown in FIG. 4, the remaining windings of the second antenna pattern 130b except for the innermost winding 134 may be divided into two groups, that is, a first half windings 132 and a second half windings 136 so that the first half windings 132 have a same first line width and the second half windings 136 have a same second line width.

For example, out of a total 11 windings, the five outer windings 132 including the outmost winding may have the same line width, and the other five inner windings 136 between the five outer windings 132 and the innermost winding 134 may have the same line width which is smaller than that of the outer windings 132. That is, the second antenna pattern 130b may include three kinds of line widths. The line width of the five successive outer windings 132 including the outermost winding may be the largest, the line width of the next five successive inner windings 136 may be medium, and the line width of the innermost winding 134 may be the smallest.

As described above, most windings of the second antenna pattern 130b are divided into two winding groups each of which has the same line width and an arrangement of adjacent windings. By increasing the line width of any one of the two winding groups, the effect on the increasing of the line width may be maximized and the total resistance value may be further reduced.

Figure 5:
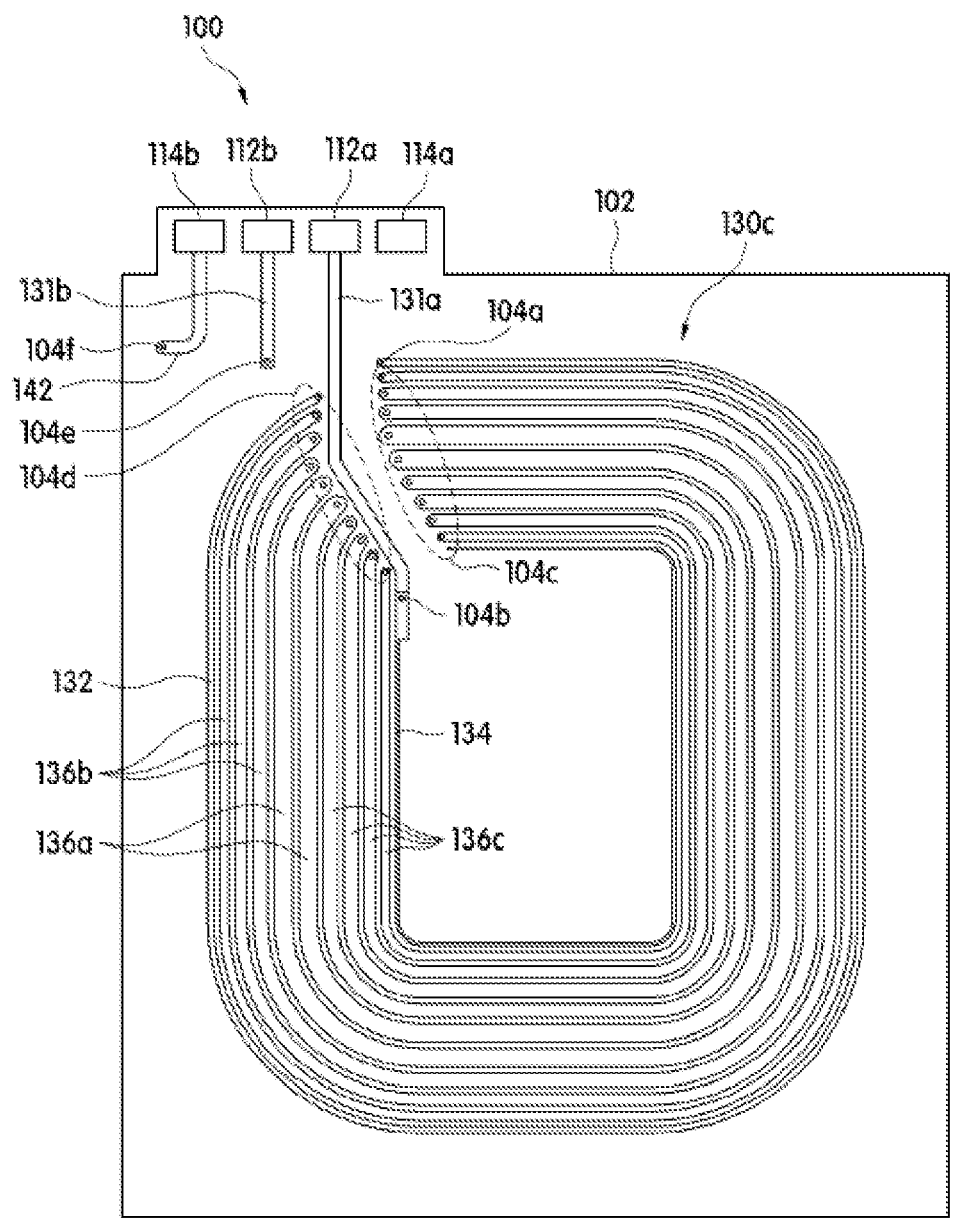

As shown in FIG. 5, at least any one of the intermediate windings 136a, 136b, and 136c of the second antenna pattern 130c may have a larger line width than that of the outermost windings 132. In this case, the intermediate windings 136b and 136c disposed between the intermediate winding 136a having the largest line width and the outermost winding 132 and between the intermediate winding 136a and the innermost winding 134, respectively, may be gradually changed in the line width.

For example, the outermost winding 133 of the second antenna pattern 130c may have a larger line width than that of the innermost winding 134. The line width of the second antenna pattern 130c may be gradually increased as going from the outmost winding to the intermediate winding 136c having the maximum line width. The line width of the second antenna pattern 130c may be gradually decreased as going from the intermediate winding 136c having the maximum line width to the innermost winding 134.

By disposing the winding 136a having the maximum line width in the intermediate portion of the second antenna pattern 130c, the total resistance value is reduced so that the heat generation amount during the wireless charging is reduced as well as the wireless charging efficiency is increased.

At this time, at least two intermediate windings 136a having the maximum line width may be disposed adjacent to each other. Therefore, similar to FIG. 3, the antenna specification such as the outer and inner diameters may be easily adjusted, thereby enhancing the degree of freedom of antenna design.

Figure 6:
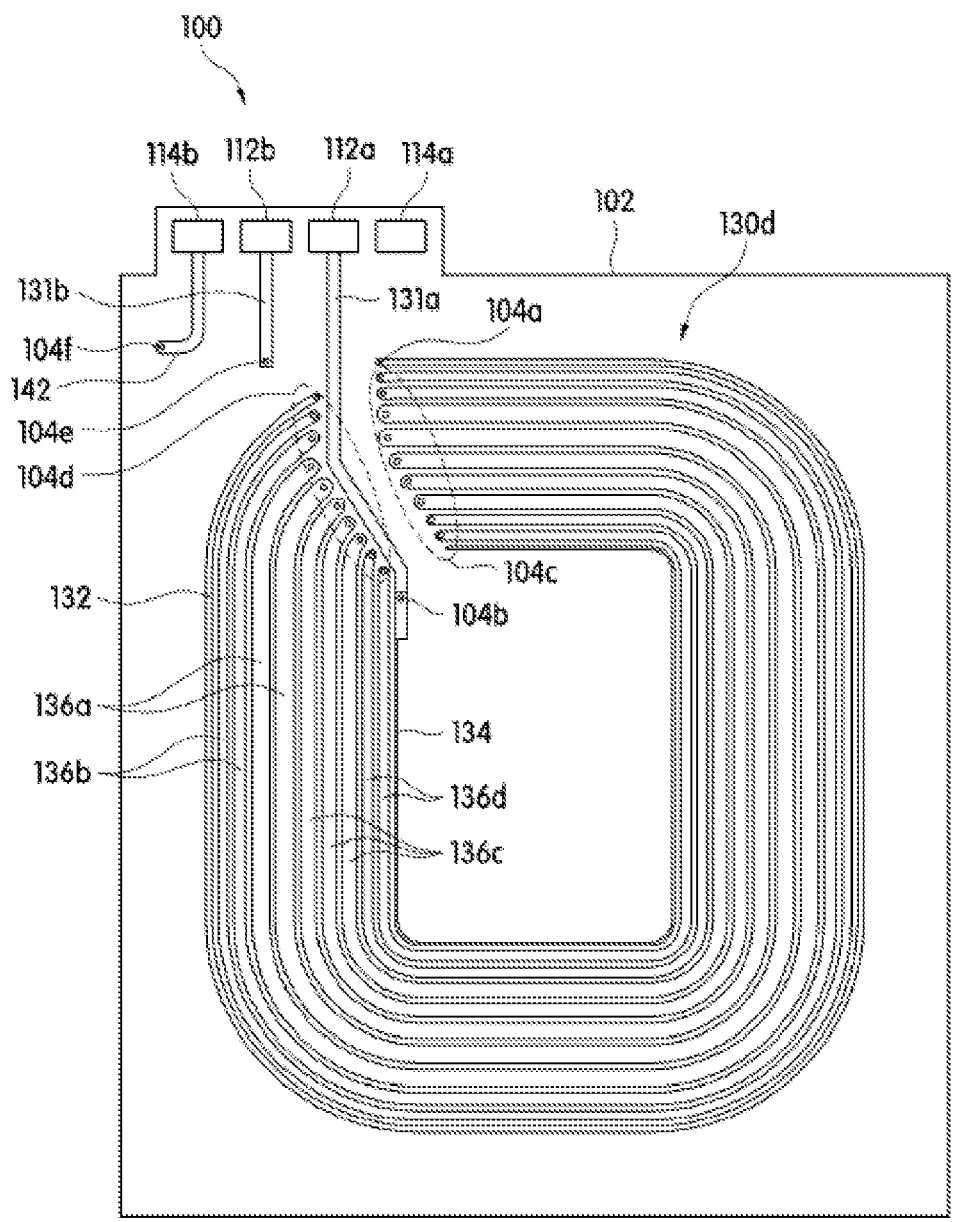

As shown in FIG. 6, the position of the intermediate winding 136a having the maximum line width of the second antenna pattern 130d may be changed to the outer portion. At least two intermediate windings having the same line width, neighboring the innermost winding 134 may be disposed adjacent to each other.

When the intermediate winding 136a having a maximum line width of the second antenna pattern 130d is disposed in the intermediate portion, the wireless power transmission efficiency may be increased. In addition, when the intermediate windings 136a having a maximum line width of the second antenna pattern 130d is disposed on the outer portion and at least two intermediate windings 136d having the same line width, neighboring the innermost winding 134 is disposed in the adjacent each other, the resistance value may be largely decreased compared to the second antenna pattern 130c of FIG. 5.

Figure 7:
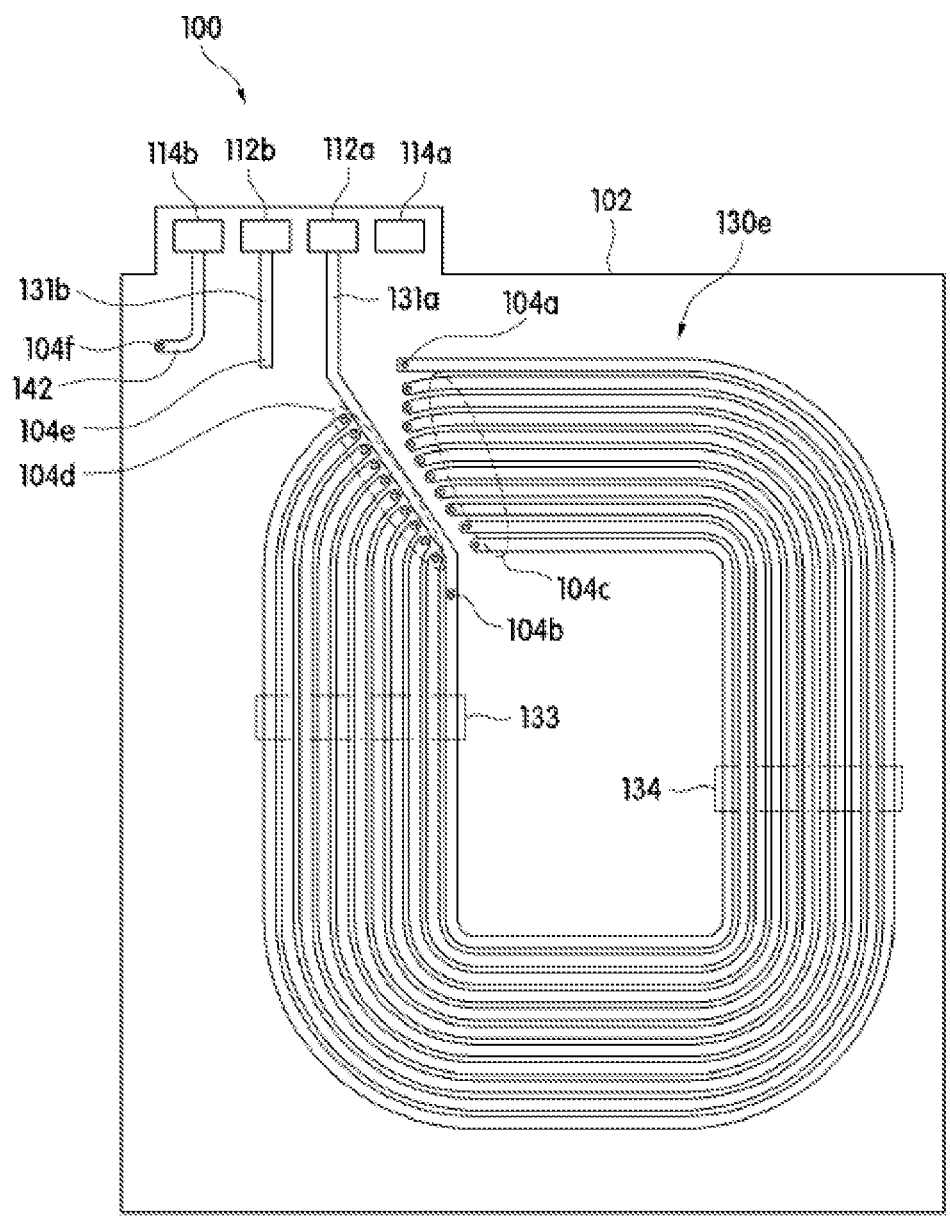

As shown in FIG. 7, the second antenna pattern 130e may be disposed in an area of which center is away from a center of the circuit board 102.

At least one of a left portion, a right portion, an upper portion, and a lower portion of the second antenna pattern 130e may have different line width from that of the other portions. For example, the second antenna pattern 130e may be formed such that a first region 133a of the left portion and a second region 133b of the right portion have different line widths.

As the second antenna pattern 130e is disposed in an area of which center is away from the center of circuit board and any one portion has different line width from that of the other portions, even the limited antenna area, the degree of freedom of antenna design depending on the spatial disposition may be improved.

In FIGS. 1 to 7, the first antenna pattern 120 and the second antenna patterns 130, 130a, 130b, 130c, 130d, and 130e are formed on both surfaces of the circuit board 102. However, the present disclosure is not limited thereto. The first antenna pattern 120 and the second antenna patterns 130, 130a, 130b, 130c, 130d, and 130e may be formed only one side of the circuit board 102.

Figure 8:
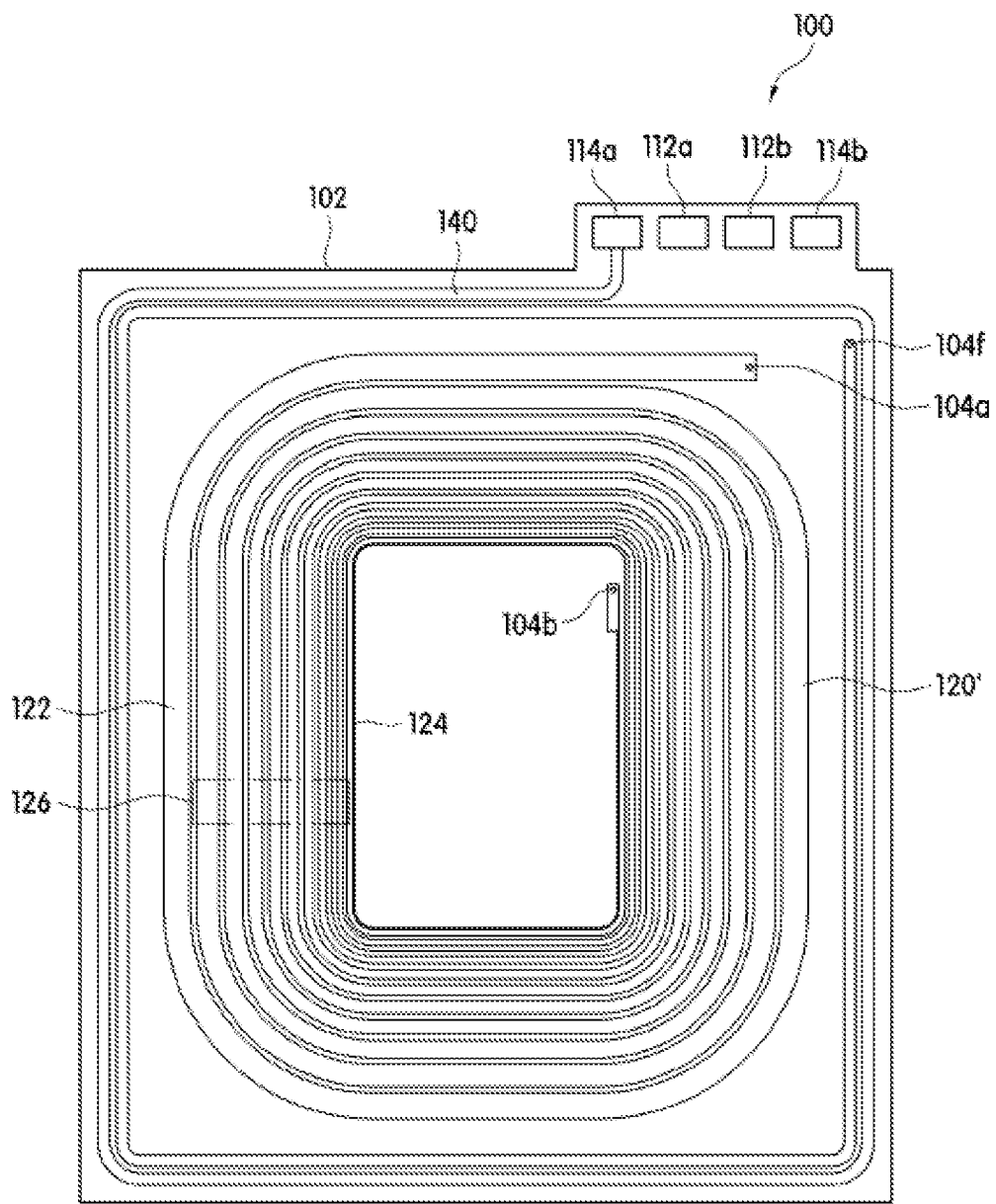
FIG. 8 is a plane view of another example of the antenna unit according to an embodiment of the present disclosure.

That is, as shown in FIG. 8, the antenna pattern 120' for wireless power transmission may be formed of a plurality of windings only one surface of the circuit board 102. Here, the antenna pattern 120' for the wireless power transmission may be disposed on the same surface as the antenna pattern for wireless communication, similar to the first antenna pattern 120 of FIG. 1, or may be disposed on the opposite surface.

Here, the antenna pattern 120' for wireless power transmission formed a single conductor including a plurality of windings, and the single conductor may be has a different line width depending on positions.

For example, as shown in FIG. 8, in the wireless power transmission antenna pattern 120', the outermost winding 122 may have the largest line width and the innermost winding 124 may have the smallest line width and the intermediate winding 126 may be gradually decreased as going from the outermost winding 122 to the innermost winding 124.

As shown in FIGS. 2 to 7, the antenna pattern 120' for wireless power transmission may have various line widths similar to the second antenna patterns 130, 130a, 130b, 130c, 130d and 130e.

Figure 9:
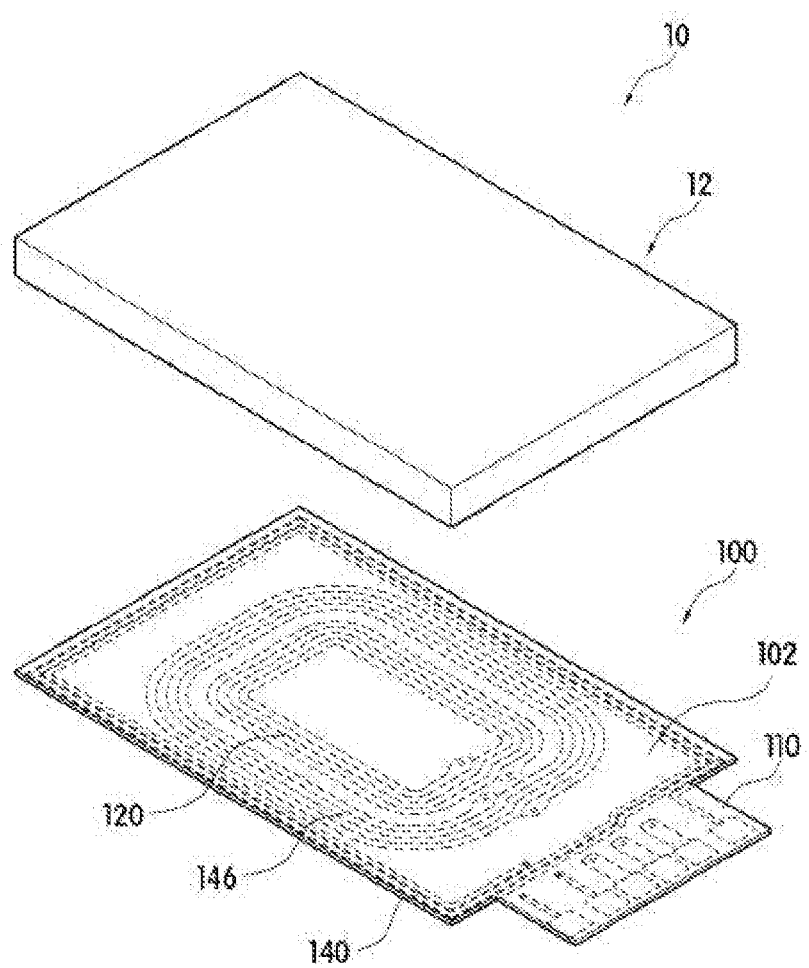
FIG. 9 is a perspective view of a wireless power transmission module according to an embodiment of the present disclosure.

Meanwhile, as shown in FIGS. 1, 8 and 9, the antenna unit 100 of the present disclosure may include third antenna patterns 140 and 146 for wireless communication. The third antenna patterns 140 and 142 may be formed outer portion the first antenna pattern 120 or the antenna pattern 120' for wireless power transmission of the circuit board 102.

Here, the third antenna patterns 140 and 146 are for receiving wireless signals from portable electronic devices such as cellular phones, PDAs, PMPs, tablets, multimedia devices, and the like. The third antenna patterns 140 and 146 may include a plurality of antennas serving different roles, for example, a plurality of communication antennas having different operating frequencies.

As shown in FIG. 9, the third antenna pattern 140 may be disposed at the outermost portion of the circuit board 102. The third antenna pattern 140 may have an operating frequency band of more than several MHz. In particular, the third antenna pattern 140 may be a communication antenna using the frequency of 13.56 MHz, and for example, may be an NFC antenna.

The other third antenna pattern 146 may be disposed on the circuit board 102 between the third antenna pattern 140 and the first antenna pattern 120 (or the antenna pattern 120' for wireless power transmission). The other third antenna pattern 146 may have a lower operating frequency than that of the third antenna pattern 140, for example, may have an operating frequency band of 100 kHz or less. In particular, the other third antenna pattern 146 may be the communication antenna using the frequency band of 100 kHz or less, and for example, may be the MST antenna.

Although the third antenna pattern 140 and 146 are illustrated and described as functioning as two antennas, the present disclosure is not limited thereto. At least two antenna having different operating frequencies from each other may be disposed between the third antenna pattern 149 disposed on the outermost area of the circuit board and the first antenna pattern 120 (or the antenna pattern 120' for wireless power transmission) disposed on the innermost area of the circuit board.

As shown in FIG. 9, the third antenna pattern 140 and 146 may be formed of a flat coil wound in a clockwise direction or counterclockwise direction. The wound flat coil may have a circular shape, an elliptical shape, a spiral shape, or a polygonal shape such as a quadrangular shape.

On the other hand, when the wireless power transmission module 10 is configured using the antenna unit 100 composed as described above, it is possible to reduce the heat generation amount during wireless charging and improve the charging efficiency.

As shown in FIG. 9, the wireless power transmission module 10 may include a shielding unit 12 for shielding a magnetic field (to shield a magnetic field and condense in a desired direction) disposed on one surface of the antenna unit 100. Here, the wireless power transmission module 10 may be a wireless power reception module built in the electronic device such as a mobile phone, a PMP, or a tablet, or may be a wireless power transmission module that transmits the wireless signal to the electronic device.

The shielding unit 12 is formed of a plate-shaped member having a predetermined area, and the antenna unit 100 is fixed on a surface of the shield unit 12.

The shielding unit 12 may shield the magnetic field generated by the antenna unit 100 and increase the magnetic field condensing rate, thereby enhancing the performance of the antenna unit 100 operating in a predetermined frequency band.

That is, when wireless power is transmitted by the magnetic induction manner in a frequency band of 100 to 350 kHz, or when wireless power is transmitted by the magnetic resonance manner in a frequency of 6.78 MHz, the shielding unit 12 is to enhance the performance of the antenna unit 100 operating in the frequency band.

To this end, the shielding unit 130 may be made from the magnetic material so as to shield the magnetic field generated from the antenna unit 110.

At this time, when the antenna unit 12 operates at a frequency band of 100 to 350 kHz in a low frequency band, the shielding unit 12 may be made from the material having a permeability, for example, in the range of 300 to 3500 Wb/A·m. When the antenna unit 100 operates at the frequency of 6.78 MHz, the shielding unit 12 may be made from the material having the permeability, for example, in the range of 100 to 350 Wb/A·m.

For example, the shielding unit 12 may include a Mn—Zn ferrite sheet, a ribbon sheet of the amorphous alloy or the nanocrystalline alloy, a polymer sheet, or the like having a permeability of 2000 to 3500 Wb/A·m in a low frequency band of 100 to 350 kHz. The shielding unit 12 may include a Ni—Zn ferrite sheet, a ribbon sheet of the amorphous alloy or the nanocrystalline alloy, a polymer sheet or the like having a permeability of 300 to 1500 Wb/A·m in the low frequency band of 100 to 350 kHz.

In addition, the shielding unit 12 may include a Ni—Zn ferrite sheet, a ribbon sheet of the amorphous alloy or the nanocrystalline alloy, a polymer sheet, or the like having a permeability of 100 to 350 Wb/A·m at a frequency of 6.78 MHz.

Here, the amorphous alloy or the nanocrystalline alloy may be a Fe-based or a Co-based magnetic alloy. The amorphous alloy and the nanocrystalline alloy may include a three-element alloy or a five-element alloy. For example, the three-element alloy may include Fe, Si, and B, and the five-element alloy may include Fe, Si, B, Cu, and Nb.

Figure 10:
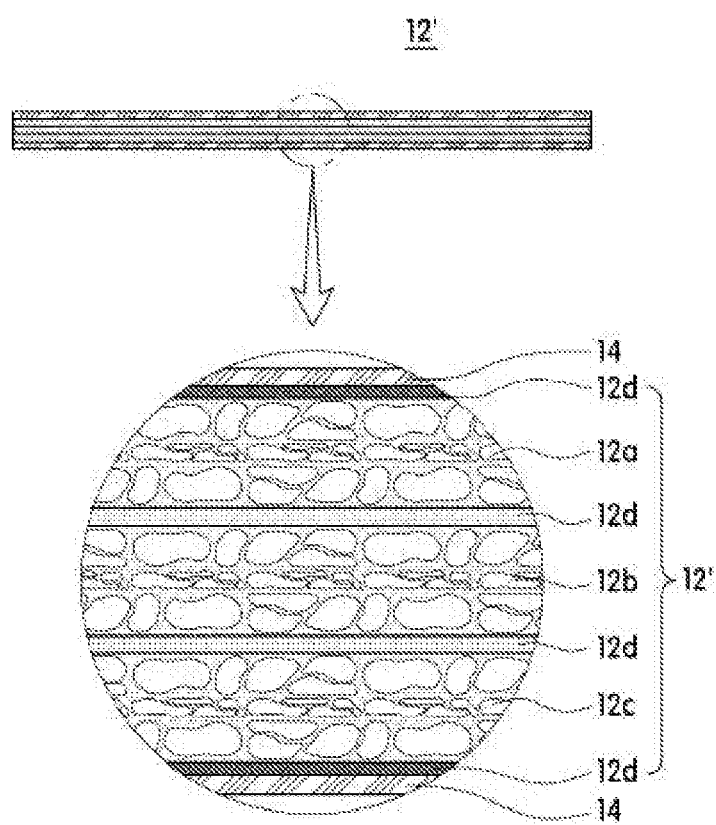
FIG. 10 is a cross-sectional view showing another example of a shielding unit shown in FIG. 9.

As shown in FIG. 10, the shielding unit 12' may be a multi-layer ribbon sheet which may be formed by stacking a plurality of ribbon sheets 12a, 12b, and 12c of the amorphous alloy or the nanocrystal alloy in two or more layers.

In addition, the shielding unit 12 may include a plurality of fine-pieces which are separated so as to suppress generation of eddy currents, and the plurality of fine-pieces may be entirely or partially insulated from the neighboring others.

The plurality of pieces may have a size of 1 μm to 3 mm, and each piece may have irregular shapes.

When the shielding sheet 12' is constructed by stacking the plurality of shielding sheets 12a, 12b, and 12c divided into fine pieces to form multi-layers, an adhesive layer 12d including a nonconductive component may be disposed between adjacent sheets. Thereby, a part or the whole of the adhesive layer 12d between adjacent sheets stacked on each other may permeate between the plurality of fine pieces constituting each sheet, and totally or partially insulate the neighboring fine pieces from each other. Here, the adhesive layer 12d may be an adhesive agent, or may be a substrate-type in which an adhesive agent is applied to a side or both sides of a film type substrate.

In addition, the shielding unit 12' may be provided with a separate protective film 14 on at least one of its upper surface and the lower surface. By attaching the protective film 14 to the shielding unit 12 via the adhesive layer, when the shielding unit 12' is separated into fine pieces, the adhesive member 12d may be permeate between the plurality of fine pieces, and insulate the neighboring fine pieces from each other. Here, the adhesive layer may be an adhesive agent, or may be a substrate-type in which an adhesive agent is applied to a side or both sides of a film type substrate.

As described above, the present disclosure has been described with respect to particularly preferred embodiments. However, the present disclosure is not limited to the above embodiments, and it is possible for one who has an ordinary skill in the art to make various modifications and variations, without departing off the spirit of the present disclosure.

What is claimed is:

1. An antenna unit comprising:
    a circuit board; and
    a first antenna pattern formed on a surface of the circuit board for wireless power transmission and formed of a single conductor including a plurality of windings;
    wherein the single conductor has a different line width depending on position,
    wherein a line width of an outermost winding of the first antenna pattern formed at an outermost portion of the circuit board is larger than a line width of an innermost winding of the first antenna pattern formed at an innermost portion of the circuit board,
    wherein a line width of an intermediate winding of the first antenna pattern between the outermost winding and the innermost winding is gradually decreased as going toward the innermost winding,
    wherein at least one of the intermediate windings have a larger line width than that of the outermost winding,
    wherein a line width of the first antenna pattern is gradually increased as going from the outermost winding to the intermediate winding, and a line width of the first antenna pattern is gradually decreased as going from the intermediate winding to the innermost winding.

2. The antenna unit of claim 1, wherein the circuit board is made from a flexible material.

3. The antenna unit of claim 1, wherein the first antenna pattern includes at least two windings having the same line width, which are adjacent to each other.

4. The antenna unit of claim 3, wherein remaining windings of the first antenna pattern except for the innermost winding are divided into a first half windings and a second half windings so that the first half windings have a same first line width and the second half windings have a same second line width.

5. The antenna unit of claim 1, wherein the first antenna pattern includes at least two of the intermediate windings, which are adjacent to each other, having a larger line width than that of the outermost winding.

6. The antenna unit of claim 1, wherein the first antenna pattern is disposed in an area of which center is away from a center of the circuit board.

7. The antenna unit of claim 6, wherein at least one of a left portion, a right portion, an upper portion, and a lower portion of the first antenna pattern have a different line width from that of the other portions.

8. The antenna unit of claim 1, wherein the antenna unit further includes at least one second antenna pattern formed outside the first antenna pattern on the circuit board for wireless communication.

9. An antenna unit comprising:
a circuit board;
a first antenna pattern formed on one surface of the circuit board for wireless charging, including a single conductor of which is formed a plurality of windings; and
a second antenna pattern formed on the other surface of the circuit board, including a plurality of conductors each of which is formed of a single winding;
wherein both ends of each of the plurality of conductors are connected in parallel to each of the plurality of windings of the first antenna pattern through via holes, and
wherein the plurality of conductors has different line widths from each other,
wherein a line width of an outermost winding of the first antenna pattern formed at an outermost portion of the circuit board is larger than a line width of an innermost winding of the first antenna pattern formed at an innermost portion of the circuit board,
wherein a line width of an intermediate winding of the first antenna pattern between the outermost winding and the innermost winding is gradually decreased as going toward the innermost winding,
wherein at least one of the intermediate windings have a larger line width than that of the outermost winding,
wherein a line width of the first antenna pattern is gradually increased as going from the outermost winding to the intermediate winding, and a line width of the first antenna pattern is gradually decreased as going from the intermediate winding to the innermost winding.

10. The antenna unit of claim 9, wherein the antenna unit further includes at least one third antenna pattern formed outside the first antenna pattern on the circuit board for wireless communication.

11. A wireless power transmission module comprising;
an antenna unit including a circuit board; and a first antenna pattern formed on a surface of the circuit board for wireless power transmission and formed of a single conductor including a plurality of windings, wherein the single conductor has a different line width depending on position;
a shielding unit disposed on one surface of the antenna unit and configured to shield a magnetic field,
wherein a line width of an outermost winding of the first antenna pattern formed at an outermost portion of the circuit board is larger than a line width of an innermost winding of the first antenna pattern formed at an innermost portion of the circuit board,
wherein a line width of an intermediate winding of the first antenna pattern between the outermost winding and the innermost winding is gradually decreased as going toward the innermost winding,
wherein at least one of the intermediate windings have a larger line width than that of the outermost winding,
wherein a line width of the first antenna pattern is gradually increased as going from the outermost winding to the intermediate winding, and a line width of the first antenna pattern is gradually decreased as going from the intermediate winding to the innermost winding.

12. The wireless power transmission module of claim 11, wherein the shielding unit includes any one of a ribbon sheet made from an amorphous alloy or a nanocrystal alloy, a ferrite sheet, and a polymer sheet.

13. The wireless power transmission module of claim 11, wherein the shielding unit is a form including a plurality of divided fine pieces.

14. The wireless power transmission module of claim 13, wherein the plurality of divided fine pieces is totally or partially insulated from each other.

15. A wireless power transmission module comprising;
an antenna unit including a circuit board; a first antenna pattern formed on one surface of the circuit board for wireless charging, including a single conductor of which is formed a plurality of windings; and a second antenna pattern formed on the other surface of the circuit board, including a plurality of conductors each of which is formed of a single winding; and
a shielding unit disposed on one surface of the antenna unit and configured to shield a magnetic field,
wherein both ends of each of the plurality of conductors are connected in parallel to each of the plurality of windings of the first antenna pattern through via holes, and the plurality of conductors has different line widths from each other,
wherein a line width of an outermost winding of the first antenna pattern formed at an outermost portion of the circuit board is larger than a line width of an innermost winding of the first antenna pattern formed at an innermost portion of the circuit board,
wherein a line width of an intermediate winding of the first antenna pattern between the outermost winding and the innermost winding is gradually decreased as going toward the innermost winding,
wherein at least one of the intermediate windings have a larger line width than that of the outermost winding,
wherein a line width of the first antenna pattern is gradually increased as going from the outermost winding to the intermediate winding, and a line width of the first antenna pattern is gradually decreased as going from the intermediate winding to the innermost winding.

16. The wireless power transmission module of claim 15, wherein the shielding unit includes any one of a ribbon sheet made from an amorphous alloy or a nanocrystal alloy, a ferrite sheet, and a polymer sheet.

17. The wireless power transmission module of claim 15, wherein the shielding unit is a form including a plurality of divided fine pieces.

* * * * *